US008370256B1

(12) United States Patent  (10) Patent No.: US 8,370,256 B1
Murphy  (45) Date of Patent: Feb. 5, 2013

(54) METHOD AND APPARATUS FOR DYNAMIC FINANCIAL LIABILITY MANAGEMENT

(75) Inventor: Kevin M. Murphy, Eden Prairie, MN (US)

(73) Assignee: MoneyAbility Technology, LLC, Plymouth, MN (US)

( * ) Notice: Subject to any disclaimer, the term of this patent is extended or adjusted under 35 U.S.C. 154(b) by 0 days.

(21) Appl. No.: 13/348,578

(22) Filed: Jan. 11, 2012

Related U.S. Application Data (60) Division of application No. 12/877,946, filed on Sep. 8, 2010, now Pat. No. 8,140,431, which is a continuation of application No. 12/135,172, filed on Jun. 7, 2008, now abandoned, which is a continuation of application No. 10/965,681, filed on Oct. 14, 2004, now abandoned.

(60) Provisional application No. 60/510,824, filed on Oct. 14, 2003.

(51) Int. Cl.
    *G06Q 40/00* (2006.01)
(52) U.S. Cl. ............................................. 705/39; 705/40
(58) Field of Classification Search ....................... 705/40
    See application file for complete search history.

(56) References Cited

U.S. PATENT DOCUMENTS

| | | | |
|---|---|---|---|
| 6,408,284 B1 * | 6/2002 | Hilt et al. | 705/40 |
| 2002/0123949 A1 | 9/2002 | VanLeeuwen | |
| 2002/0152168 A1 * | 10/2002 | Neofytides et al. | 705/44 |
| 2003/0033242 A1 | 2/2003 | Lynch et al. | |
| 2003/0204460 A1 * | 10/2003 | Robinson et al. | 705/35 |
| 2003/0208445 A1 * | 11/2003 | Compiano | 705/40 |
| 2005/0160038 A1 * | 7/2005 | Albornoz | 705/42 |

FOREIGN PATENT DOCUMENTS

WO  WO 0233873 A2 *  4/2002

OTHER PUBLICATIONS

Credit Where Its Due: There's no point helping clients build assets if the money ends up flowing down a credit drain. Start by checking credit reports. Louisa Woodville Employee Benefit News.*
Money 98 vs. Quicken 98. (Microsoft Money 98 Financial Suite; Quicken Deluxe 98) (includes related articles on the Open Financial Exchange standard and the Editors' Choice)(Personal Finance on Your PC) (Software Review)(Evaluation) Yakal, Kathy PC Magazine , v17 , n4 , p. 103(10) Feb. 24, 1998.*
Jaffe, Chuck, "The Devil's in Credit Card Details", "ISSN: 07431791 ProQuest Document ID 389710511", Aug. 28, 2003, Publisher: Boston Globe.
Jefferson, Steve, "Fast mortgage-payoff system attracts local investors", "Pacific Business News. Honolulu", Nov. 1, 2002, p. 40 vol. 40, No. 34.
Whitehouse, Kaja, "Why It Is Time to Reduce Your Debt—Easy Credit Access Has Led Many People to the Limit of What They Can Pay", "Wall Street Journal. (Eastern edition)", Oct. 22, 2002.
Woodville, Louisa, "Credit Where Its Due: There's no point helping clients build assets if the money ends up flowing down a credit drain. St", "Employee Benefit News", May 1, 2003.

* cited by examiner

*Primary Examiner* — William Rankins
(74) *Attorney, Agent, or Firm* — Jonathan M. Rixen; Lemaire Patent Law Firm, P.L.L.C.

(57) ABSTRACT

Financial liabilities are dynamically managed by receiving liability information relating to a client associated with multiple financial liabilities. Each financial liability is associated with a respective interest rate. A payment is allocated among the financial liabilities, for example, as a function of the interest rates associated with the financial liabilities. When a change in a financial liability occurs, the allocation of the payment is adjusted.

7 Claims, 6 Drawing Sheets

METHOD AND APPARATUS FOR DYNAMIC FINANCIAL LIABILITY MANAGEMENT

CROSS-REFERENCE TO RELATED APPLICATIONS

This application is a divisional of U.S. patent application Ser. No. 12/877,946, filed Sep. 8, 2010 (which issued as U.S. Pat. No. 8,140,431 on Mar. 20, 2012), which is a continuation of U.S. patent application Ser. No. 12/135,172, filed Jun. 7, 2008 (now abandoned), which is a continuation of U.S. patent application Ser. No. 10/965,681, filed Oct. 14, 2004 (now abandoned), which claims the benefit under 35 U.S.C. §119 (e) of U.S. Provisional Patent Application No. 60/510,824, filed Oct. 14, 2003, each of which is herein incorporated by reference in its entirety.

FIELD OF THE INVENTION

The invention relates generally to liability management and more particularly to a system and method for dynamic financial liability management.

SUMMARY OF THE INVENTION

The Liability Management system is designed for use by a qualified person, most often a financial professional, to provide financial reports and implementation tools and methods for use by and/or on behalf of the individual by financial service professionals and firms.

The disclosure includes proprietary web based tools, software applications, methods, processes and algorithms in order to generate products and services for the financial professional, and the end user individual and household clients. Additionally the disclosure configures commercially available tools, financial service industry processes and products in a unique and proprietary way to provide its products and services.

The core offering includes a report that compares a household's current financial condition, specifically including and not limited to, anticipated time in debt and interest paid under current financial obligations, to a scenario that the disclosure produces and reports. The application calculates and presents a graphical and numeric financial outcome for the household client, utilizing certain methods and information produced by the software application.

The application utilizes client credit information obtained online, formatted and edited to the applications need. A module referred to as 'Mortgage Business Logic" is a proprietary application utilizing rules based mortgage industry criteria to produce a commercially reasonable initial mortgage program for purposes of completing the Liability Management Report If the client chooses to proceed to the next implementation step, the client's financial information is then automatically loaded into a comprehensive bill payment system called "Dynamic Liability Management", or "DLM". DLM utilizes online data combined with the Company's online and proprietary financial calculator to calculate and implement the payment schedule created. If any of the bills change, the disclosure captures the change via the Internet, recalculates a new solution and re-implements the new payment solution subject to rules based criteria and verifications in the disclosure.

The result is a comprehensive set of analytic tools and processes that can be used for household financial information retrieval, analysis, reporting and transacting in an automated and seamless manner from the user perspective.

BRIEF DESCRIPTION OF THE DRAWINGS

FIG. 1 is a flow diagram illustrating dynamic financial liability management according to one embodiment.

FIG. 2 is a flow diagram illustrating an example process for use in dynamic financial liability management according to another embodiment.

FIG. 3 is a flow diagram illustrating an example process for use in dynamic financial liability management according to still another embodiment.

FIG. 4 is a flow diagram illustrating an example process for use in dynamic financial liability management according to still another embodiment.

FIG. 5 is a system diagram illustrating an example dynamic financial liability management system according to another embodiment.

FIG. 6 is a flow diagram illustrating an example process for use in dynamic financial liability management according to still another embodiment.

DETAILED DESCRIPTION

The process begins at step 101 where the client or the client's Financial Professional, "FP" enters the client information including the following on a minimum basis for each of the clients. The disclosure is designed for use by a single individual as client or a combination of up to two individuals, whom if choosing to buy the sources together shall be known jointly as "Client" or "client":
First and Last Name with middle initial
Street Address
Phone Number
Social Security Number
Email address if available
Estimated Home Value
Estimated Gross Monthly Income
Estimated Net Monthly Income
Client User Name
Client Password When the client submits the information, it is analyzed in step 102 to confirm that the minimum information necessary has been entered.

If step 102 it is determined the information entered is insufficient the prospective client is returned to the web form in step 101 with advice on what additional information is necessary to proceed.

If step 102 is successfully completed, a New Customer File, or "NCF" is established in step 107 in the database, indicated as step 108, and the information is merged into the "Subscription Agreement" and presented to the client for printing, signature and submission to the respective company.

Following the above described process from step 102 to step 107, the email responder is initiated to notify the appropriately bound individuals and/or firms that a new Client has been successfully entered as shown for the Client, FP, and the company as shown in steps 104, 105, and 106 respectively.

Simultaneous to the creation of an NCF in step 107, the following steps occur automatically:

The home value and income information entered in step 101 is forwarded to the 118 the Mortgage Fulfillment storage area for future use for optional automated Mortgage Product decisioning.

Step 110; a new and secure, password protected Client reporting section is created. The client reporting section is automatically bound to the Agent of Record as determined in a dropdown list of agents resident on the online client application, step 101. This "binding" is consistent through the application. It allows for the export of client report generation from the to-be-discussed Scenario Edit area of the application including steps 120 to 123.

Creation of the NCF drives the creation of a client file interface indicated in step 111. This interface for the FP in the "Agent Zone" is used by the FP to make modifications to the Client File in order to produce the Liability Management Report. The Agent Zone is a password-protected and secure area for the FP to conduct their work, monitor their business activity and pay Company charges as they become due.

The Agent is billed upon the creation of an NCF in step 112, and the General Ledger is updated. Current and past business activity can be viewed by the Agent and their authorized and bound supervisors in the "Business Reporting Section" of the Agent Zone referenced in step 111.

The FP begins the work on the file by pulling a credit report as indicated in step 113.

The client information is already formatted for connectivity with the credit reporting industry. The credit information is split at this point in the process.

Trade lines, or liabilities are loaded into the client information and can be accessed with the "Liabilities" link within the "Information Set", or as-is client information data record as indicated in step 115.

The credit scores are sent to the client record and the mortgage fulfillment section, step 118.

The FP, in order to generate a client report, must be able to review, confirm, or modify the liability information obtained from the credit report and loaded into the application. This activity is performed in step 116. An embodiment of the disclosure developed for FP modification of pre-formatted and credit report populated client financial information in order to create and deliver a liability management report is called the "Edit Bar." The Edit Bar is a tool that once initiated by clicking the "Edit" link on a given trade line, or liability, grants the FP access to edit and modify the information within the client record in the database. Use of the "Edit Bar" enables the following activities by the FP:

Add interest rate to a trade line. For any given liability, the credit report information contains the outstanding balance for the obligation, and the payment amount per month. By adding the interest rate, we add the third of the four variables necessary in order to solve for the "Term" or number of payments on the loan. Given this information, we are able to:
  Calculate the amount of interest paid on the particular trade line
  Summing the interest paid on each trade line into the total amount of interest paid if the obligations are paid per the reported terms.
  Amount of principal paid per obligation per month
  The time in debt until the last obligation is paid off.
  Confirm the Liability type: E.G. mortgage, automobile, credit card etc.
  Allows a quality control point in the process in order to correct for misinformation within the credit report.
  Provides for the mission critical ability to sort by liability type, with a sensitivity to secured and relevant mortgage debt versus unsecured debt, in order to generate scenario results
Input the presence of Private Mortgage Insurance, PMI or not
  Input amount of PMI
  Calculate change in payment attendant to above changes
  Apply and update the client database record.

Step 116 is part of a larger embodiment that provides for the broader edit of the client financial information including, but not limited to the following:
  Modify Housing Expense and subtract, or not from the Housing Payment as reported in the credit report
  Property Taxes
  Hazard Insurance
  Homeowner Association Payment
  Asset Information
  Income Information
  Property Information
  Modify Home value
  Bind Mortgage to property
  Employment Information ACCELERATION: Accelerating of the liability payments is at the core of the financial calculator's algorithmic method. Acceleration is the principal of keeping the aggregate payment of liabilities constant until all of the included liabilities are paid. Once one liability is paid off, and thereby no longer needing to use available cash for payment, this amount is added to liability #2 payment and paid to liability #2 until that liability is paid off. The process is then continued to liability #3 if present, and then to all following liabilities. The payment priority can be set in a number of ways. The programming is designed to prioritize payment toward the highest interest rate of the still unpaid lines. It is believed this is generally the most cost-effective way to pay down multiple debts within an "Acceleration" context.

Once the FP is satisfied with the final editing of the information loaded initially from the client form, step 101, and the credit report, step 113, and as modified in the "Information Set edit in step 116, they proceed to create a scenario. To do so, the FP needs to address the mortgage requirement if present. To do so the FP proceeds to the "Mortgage Business Logic" (MBL) section of the application.

MBL, step 119 is an embodiment that utilizes information entered and edited earlier in the process to make decisions and attendant calculations relating to qualify mortgage programs. Mortgage programs may or may not be differentiated from mortgage products in that:
  Mortgage Programs are non company specific
  Mortgage Programs are generally described and decided at a higher level of client and underwriting detail then the products.
  Mortgage Programs are not individually priced, but address a general range of pricing attendant to the program type, and as differentiated from other mortgage program pricing
  Mortgage Programs generally need to be decided before a product is selected within the program area.
  Final underwriting and approval requires pricing:
  Of an individual mortgage product
  With a maximum payment for a given program MBL is written to take the available information and render an initial decision of the mortgage program used for the calculation of a scenario. It requires the following information to function:
  Debt to Income, (DTI) information and ratios
  Loan to Value, (LTV) information and ratios
  Credit Scores The information referenced in the items above have been previously entered in the process and are stored and accessible, and referenced in step 118 the "Mortgage Fulfillment Information structure of the disclosure.

MBL, step 119 utilizes the information in step 118 along with programming algorithms to determine an initial mortgage program. E.G. First vs. Second Mortgage, or First and Second Mortgage used simultaneously or not, the need or lack thereof for PMI.

Once the Mortgage program is decided, closing costs resulting from the modeled mortgage program are calculated and preliminary calculations are performed. Additional costs related to the costs of implementing the Liability Management Report and Fulfillment, and the capitalization of the "Disbursement Account" are added as requirements prior to the calculation of the funds available for consolidation. The results from the calculations are tested against a set of proprietary rules in order to initially determine if the result of the calculations comply with the rules based set of determinants to allow for system use of the selected mortgage program. If yes, a decision is allowed and the automated process is allowed to proceed. If no the automated process will not proceed. The FP must then:

Confirm information from the Information Set in step 116
Terminate the consolidation modeling and use "Acceleration Only" for the solution
Select the "Manual Mortgage" option within the MBL section and proceed to "Scenario Edit" section
The "Send to Scenario Edit" connecting step Information step 119 to step 120, references the Scenario Edit Section of the application. This is the location at which the FP does their final modifications to the information before the calculation of the result. Each result is referred to as a "Scenario."

A "Scenario" means a unique result including a set of financial results for the client given the input and modified information and predicated upon the fact that the client:

Proceeds to perform the program per the criteria calculated
Interest rates are considered fixed for purpose of calculation
The Client does not incur, nor payoff debt other then as calculated.
Client purchases, and continues to purchase over time any financial products indicated in the production of the specific scenario.
Monthly payments for any of the financial products purchased do not change.

Within the Scenario Edit section, the FP can enter the monthly cost for any financial product purchases or cash set asides they wish to financially model and demonstrate to the client. This information is entered in step 120. The FP enters the title and monthly payment for each item. The application allows for a "Move Up, Move Down" ability to change the payment order and priority of the financial products relative to each other.

The FP now launches the Calculator, step 121. The calculator takes all of the information automatically and/or manually input, modified, and edited and uses it to calculate solutions for the client. The solution includes, but is not limited to a set of numeric and graphical results. Each result for a given set of information is referred to as a "Scenario."

Whatever number, "n", of financial products and/or cash set asides are entered under the "Add a Product" section of step 120, the calculator will render a number of scenarios equal to "n+1", subject to the availability of monthly cash flow to do so. The reason for this is that the first calculation utilizes all of the post consolidation available cash flow for the repayment of debt. The calculator then searches for a financial product having been entered from the "Add a Product" link. Upon finding the product the monthly payment is subtracted from the monthly payment available. The calculation is re-run and the results are stored. That process is repeated until all financial products loaded produce a result.

The FP can view a summary of the scenarios produced in the "Scenario Results" table. Upon selecting one for detailed review and graphics generation by clicking upon the "Results" link initiates the step 122 Results section.

The FP can view the final report, including graphics, numeric tables, summary, and payment programs. If the FP wishes to deliver and expose the result to the client, they do so at this stage by clicking the 'Export Results" link in the summary page.

The report now exports to step 123, the secure client viewing area for viewing. Upon login, by the client, they will discover the report for their review. The report can be viewed in a graphics only "Summary View", or utilizing "Detailed View" to expose the numeric tables of results The client now decides to:
Have the report modified by the FP and rerun
Purchase further the Fulfillment
Purchase the Setup and Annual subscription to the Personal Financial Web Pages, (PFWP)
Terminate the process and/or pay for the Report Steps 125 and 126 purchase and continue decision being made by the client to take the process to the next level. Selection of 125 or 126 results in the production of the PFWP unique to that client as indicated in step 203 indicated on FIG. 2. The PFWP consists of an expanded client viewing area as further described in FIG. 6 and in narrative later in this disclosure. See "Personal Financial Web Pages".

Upon creation of the PFWP, the approved result in the prior steps 201 and 202 are duplicated as a starting point for the Fulfillment or Annual PFWP.

Information is prepared compliant to OFX XML standards for export to a depository institution. The information referenced in step 205 is for the establishment of a new Direct Deposit Account, (DDA), and also in PDF exportable format for email or fax transmission.

Figure 5:
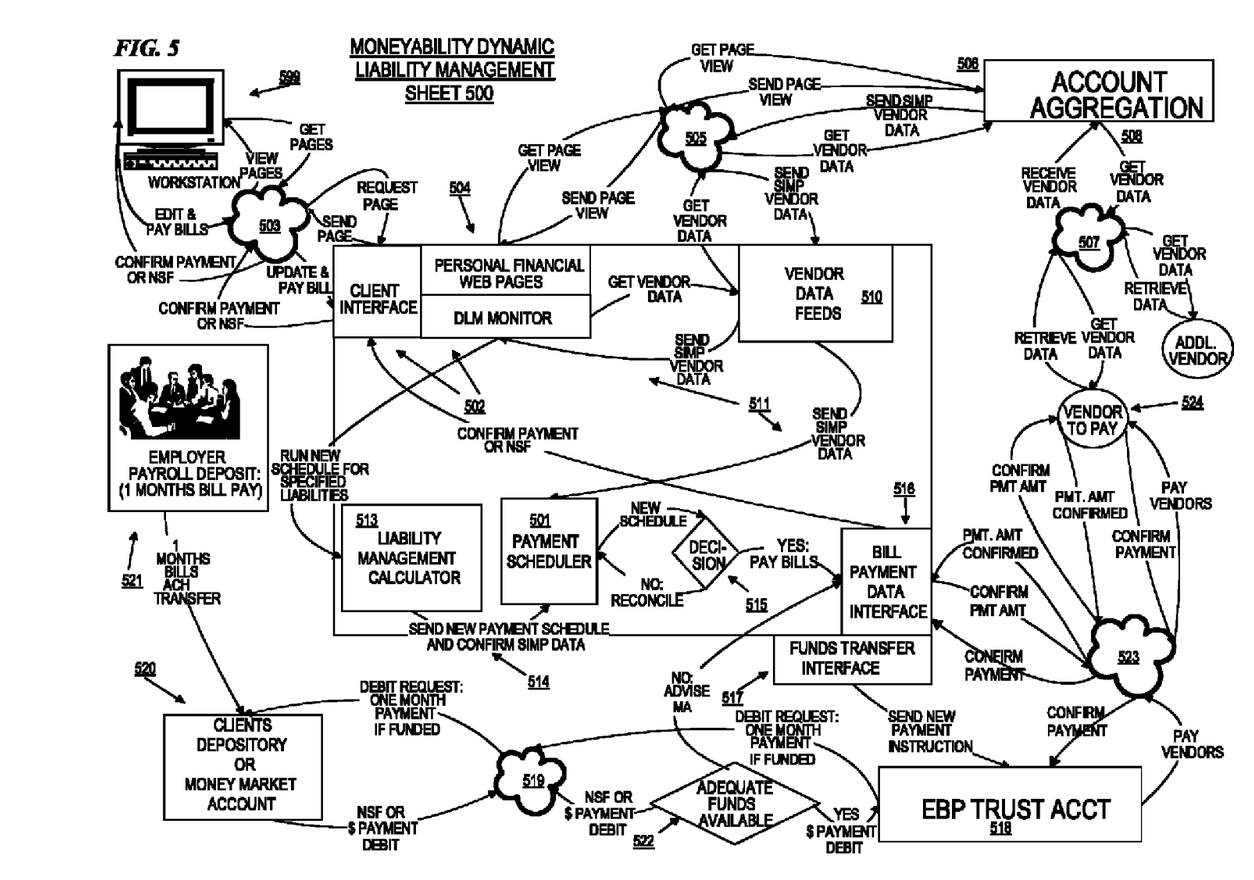

All necessary liability and sinking fund information is sent to the Dynamic Liability Manager embodiment indicated in step 205 and as further described in this document and illustrated on FIG. 5. During the ensuing process the FP or their assign must update the date of launch of the client program is step 207. This section of the disclosure is conceived to allow for an area to update progress information regarding to a mortgage process if present.

Step 208 provides for the tools to confirm setup of a direct deposit to be used in whole, or in part as a disbursement account for the near and long term execution of the client Liability Management Program.

Step 209 provides for the preparation of the staring liability information of the launch of the "Dynamic Liability Manager earlier referenced and later described in detail.

Overview of the Personal Financial Web Page (PFWP) and Dynamic Liability Manager (DLM):

The Dynamic Liability Manager is a combination of Web based tools and applications to allow for the coordinated online payment of a universe of client financial obligations on a continuing periodic basis. One of the unique functions is the combination of the screen scrape utility in a third party account aggregation with internal liability payment scheduling and Electronic Bill Payment (EBP).

The DLM functionality will reside from the household or individual Client's perspective within a set of client centric web pages. The client accesses this web-based offering through a single user name and password. The PFWP will offer additional features beyond DLM including account aggregation and the ability to monitor and run scenarios for the client's liability management solution. DLM is a tool that will:

Pay a set of liabilities in a timely basis

Search each client account daily for bills to be paid

Monitor payment amount and changes in payment amounts vis a vis account aggregation on a daily basis Integrate payment changes into a new schedule input Recalculate a new schedule utilizing the calculator in step 121

Isolate impact to Margin (the amount of available cash after minimum monthly payment of all obligations.)

Isolate the payment of the then due to be paid liability from the newly calculated schedule Store date to be paid Pay upon calendar date Set the DLM to trigger process steps described in 1 through 9 above and loop to completion.

Step 209 references the embodiment and interface where all relevant information necessary to the successful launch and implementation of the DLM.

Step 210 refers to the interface for mortgage closer to indicate the successful completion of a mortgage process and the terms and conditions thereof, including but not limited to recission period.

Step 211 refers to automatic notification, or the interface to input the confirmation of the mission critical funding of the Disbursement account.

Upon completion of all necessary prior steps earlier referenced, step 212 is made ready to launch the DLM. Launch is initiated from a switch within the DLM embodiment, or with the passage of time and as loaded in step 210 and confirmed in step 209.

Mortgage Preference Decisioning

Figure 3:
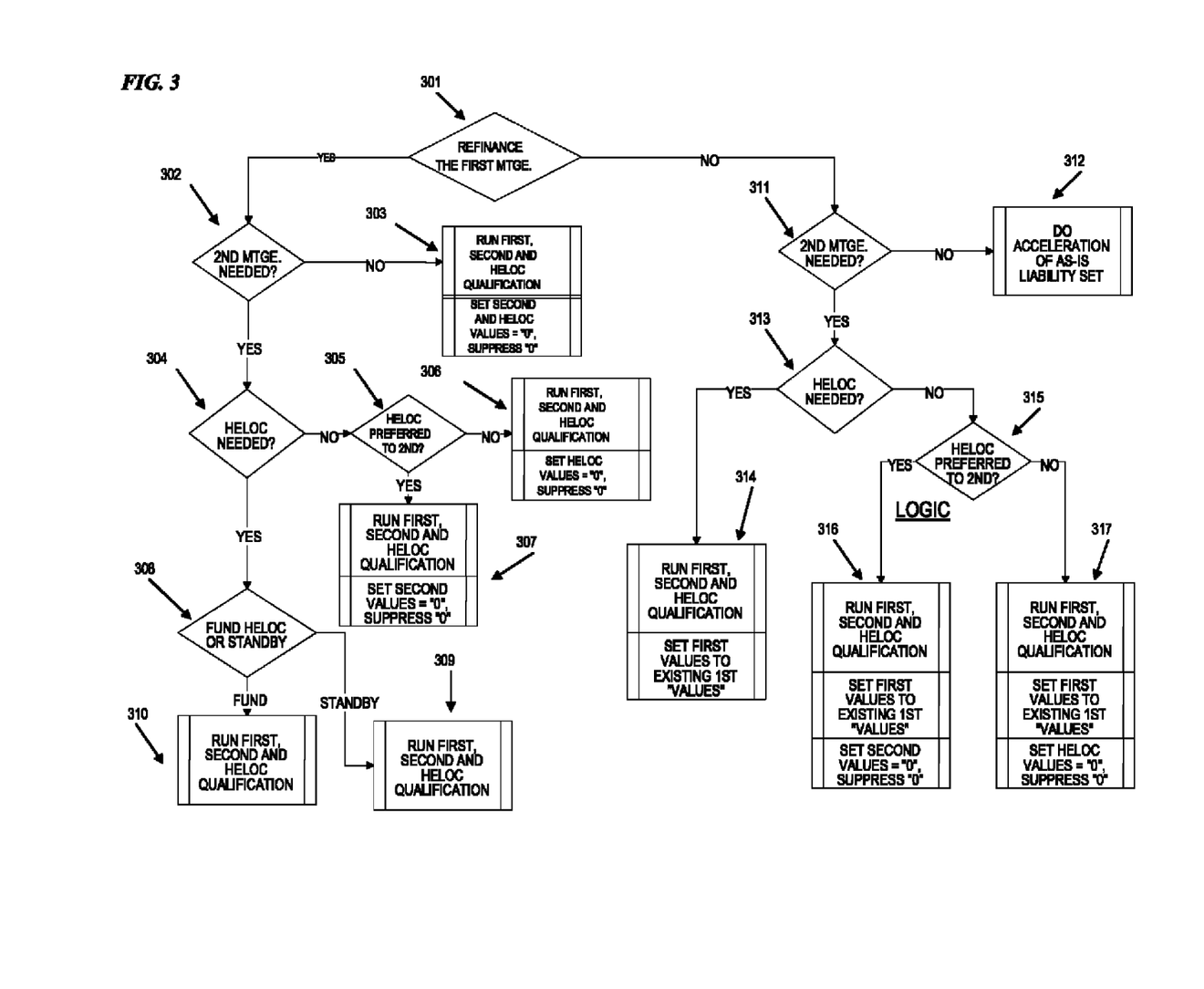

FIG. 3 is designed to depict the method by which an FP is able to get an initial mortgage program selection in order to proceed to the scenario edit section of the application in order to generate a Liability Management Report (LMR). The mission critical functions this portion of the application performs include:

Allow a non-mortgage professional FP to select a mortgage program.

Facilitate the above referenced determination in a manner that has reasonable probability for eventual use in the marketplace.

Figure 4:
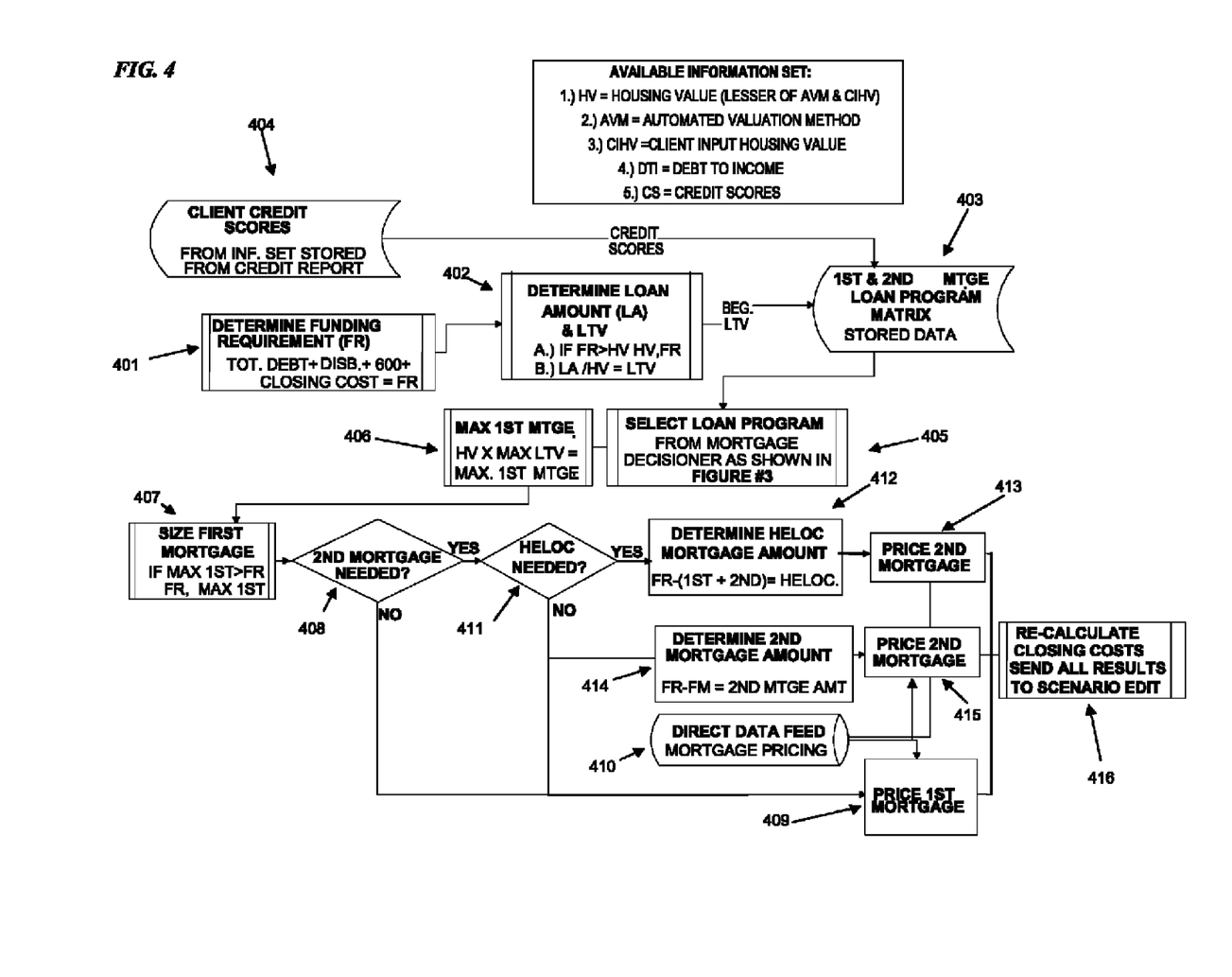

Use the common calculating engine described in FIG. 4 in a number of different mortgages instances to select the appropriate mortgage program. E.G. First Mortgage only with or without the need for Private Mortgage Insurance (PMI), Use of a second mortgage or Home Equity Line of Credit and/or HELOC, singly or simultaneously, with or without a new or existing First Mortgage.

As shown in FIG. 3, the process begins at step 301 where the initial question is posed as to whether or not there is a desire to refinance the first mortgage. If yes, we proceed to step 302 where there is a decision made as to whether or not there is a need for a second mortgage in order to meet the FR, or "Funding Requirement". If the answer to that question is yes, a decision is made first as to the additional requirement for a HELOC combined with a first and second mortgage as indicated in step 304.

If the answer to decision step 302 is no, then we proceed to step 303 and run the algorithm to determine the appropriate first mortgage parameters. This particular mortgage use case is "First Mortgage Only" use case by definition sets the values for a new second mortgage or a new HELOC equal to "0". The FR is determined dependant upon the earlier referenced "0" settings utilizing the Mortgage Calculator, (MC). Upon calculation, the solution is sent to the Scenario Edit section as indicated between steps 119 & 120 in FIG. 1. This is true for all mortgage preference decisions, and for purposes of brevity, the reader can presume, absent any reference to the contrary, that upon calculation that the result will be sent to the "Scenario Edit" section as referenced above upon the reference: "runs the calculation."

If alternatively step 304 is accessed by the application, there are two decision outcomes. First, if no HELOC is needed, the next decision indicated in step 305 is the preference between a HELOC and traditional second mortgage product. If a HELOC is not preferred as the source of second mortgage funding, then the application proceeds to step 306, sets the HELOC value in the MC to "0" and runs the calculation.

If the result of the HELOC preference is "yes", then the application proceeds to step 307. The value for the second mortgage alternative is set to "0" and runs the calculation.

If step 304 returns a "yes" decision the application proceeds to step 308. The mortgage condition precedent to step 308 is that a determination that a new first and second mortgage, and a new HELOC are all required or desired. At this point the application assumes full funding of the second mortgage per the available rules, and needs to have a determination of whether the HELOC is initially funded or is to be used in a standby status. Standby means that the borrower will be qualified for the HELOC, but that it will be opened but not funded at the time of the mortgage closing. Funded means that the HELOC will be opened and funded to the amount required under the funding requirement or the maximum amount of the combined loans if so constrained. Once the determination is made between steps 309 and step 310 the application runs the calculation.

If the decision in step 301 is input as a "no" value, the application proceeds to step 311. The decision required is whether a second mortgage is needed or desired. If the input value is "no", the application proceeds to step 312. The process at this step is to run a calculation for the payoff of the existing as-is liability set using the earlier referenced acceleration technique in order to obtain a more efficient payoff of the liabilities. The application runs the calculation.

Given the input of a yes value in step 311, the application proceeds to step 313. The FR drives the decision in step 311. If the FR is in excess of available funding under the second mortgage then the application will proceed to step 314 which is the mortgage use case for the result based upon the use of the existing first mortgage and a new second mortgage and HELOC. At this point, the application will run the calculation.

Given a "no" value for the decision in step 313, the application proceeds to decision step 315 where the preference for a second mortgage or HELOC is made. If a "yes" value is returned by the FP or by previously determined and entered rules based input, the application proceeds to step 316. The mortgage condition existent at this step is to use the existing first mortgage values, and to use a HELOC in the second mortgage position. HELOC funding amount will be determined by the constraining variable between 1.) The FR, or 2.) Available loan limits under the HELOC rules currently input. The application will run the calculation.

Given a "no" value in step 317, the mortgage instance or use case is for use of a new second mortgage with existing first mortgage values, and setting HELOC values to "0". The application will then run the calculation.

Referring now to FIG. 4, at step 401a funding requirement is determined. The funding requirement, (FR) is the amount of funding needed to satisfy some of the requirements for the overall Liability management application to run and return a result in the scenario edit section. The funding requirement as defined in step 401, if not constrained by loan to value, (LTV), Debt to Income, (DTI), or credit scores equals the sum of:

The total amount of the Debt outstanding, plus

An amount equal to the amount of the monthly payment currently paid on interest bearing bills to be deposited in a Direct Deposit Account or Money Market fund, the "Disbursement Account"

The $600 program fee for the service. Funds to be taken from new mortgage proceeds Loan Closing Costs.

Once the ideal finding requirement has been ascertained, the next step is to determine the first mortgage size and the new LTV. This process occurs in step 402 of the process. Herein the FR is compared to the home value, (HV). If:

The FR is less then the HV then the loan is sized to the FR and the LTV is calculated by dividing the FR by the HV.

The HV is less then the FR, and then the HV is used as the preliminary loan size.

Figure 1:
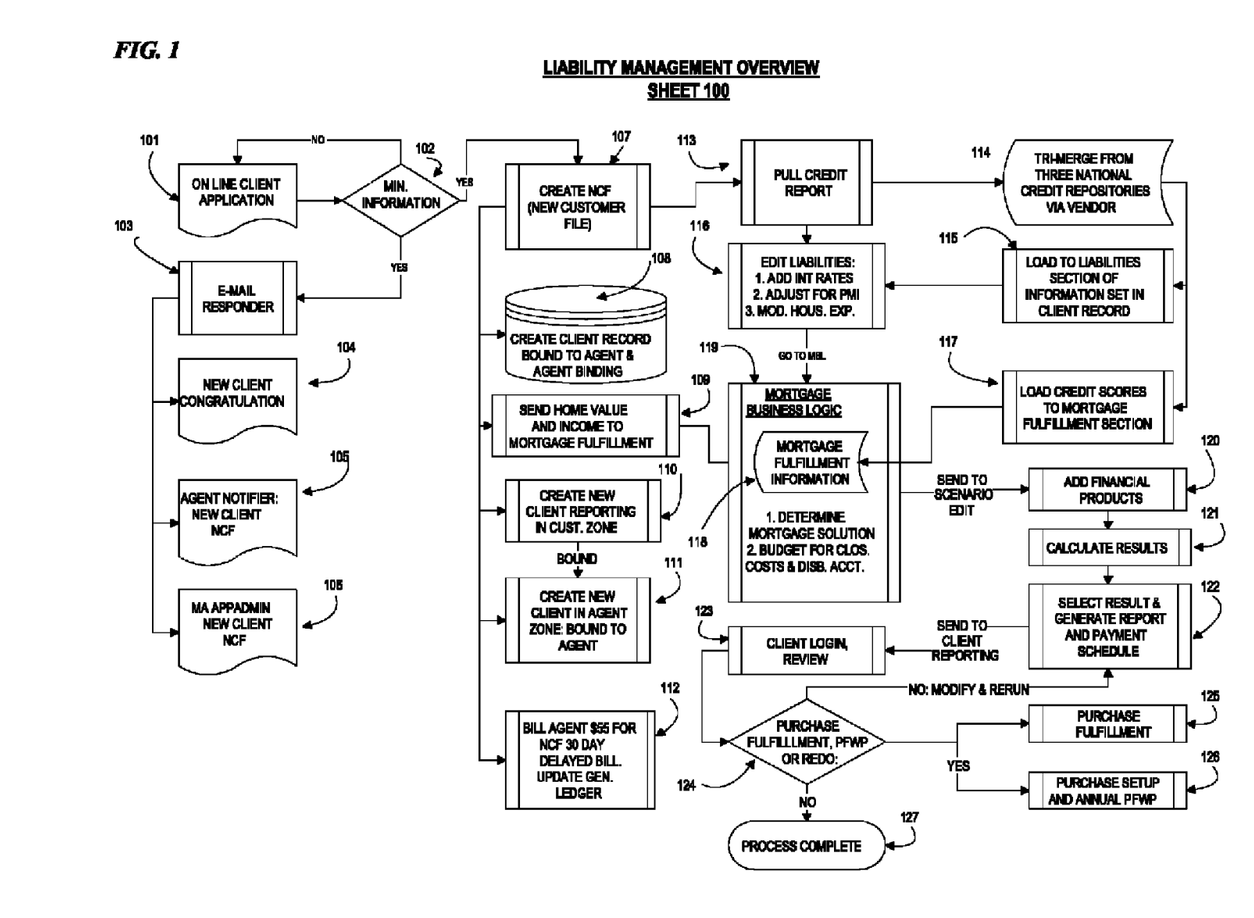

The LTV is then stored in the First and Second Loan Matrix information area as shown in step 403. A call is made for the credit score results stored from the process shown in step 113 of FIG. 1. The loan size, LTV, Income an DTI information from step 109 of FIG. 1 are then sent to step 405 where rules based decisioning occurs form a set of allowable mortgage parameters compared against available client data to determine the optimal first mortgage solution we are able to obtain. The decisioning priority is as follows, and loops until on determinants have been minimally satisfied. The determinant priority application in step 405 is as follows:

Credit Scores E.G. 80/10/10 requires a credit score of 700 or above.

LTV:
If Credit Score<700, and LTV>80% Then PMI.
If Credit Score>700 and LTV>80% The 80% First mortgage DTI: Maximum
Housing Ratio<33%
Total Ratio<42%

Once the first mortgage has been properly sized a decision needs to be made as illustrated in step 408. This value equals the result given in step 407, subject to any automatically generated result; subject to any of the over riding constraints as input form the process in sheet 300. If this amount is less then the FR, a second mortgage is used by the application subject to the default or input values entered earlier in the process. If no, the application proceeds to step 409, where the first mortgage is priced in terms of interest rate.

If a "yes" value is returned from step 408, the application proceeds to the decision in step 411 as to the requirement of a HELOC. If step 411 returns a "no" value, or is overridden from process described in FIG. 3, the engine proceeds to step 414, and proceeds to step 414, where the second mortgage is sized, and selected subject to certain constraints.

If step 411 returns a "yes" decision, then using the data to date, HELOC value and interest rate payable, is determined by our rules basing. The HELOC is the difference of the FR minus the sum of the new first and second mortgage as indicated in step 412.

If step 411 returns a "no" value, then the application proceeds to step 414, where the second mortgage amount becomes the plug variable until constrained by other criteria in the rules. E.G. LTV. Once the HELOC and the Second Mortgage pass these steps, they are priced, (interest rate from direct data feed as shown in step 410), and forwarded to step 416 for a confirmation of closing cost amounts. The solution is then looped back to step 407 and forwarded through the forward process steps to confirm the solution. The mortgage solution is now sent to step 120 "Scenario Edit" for further use in the client program.

FIG. 5 depicts the method, logic, and process by which the software application, or engine determines and manages the payment of specific and included end user client bills on a monthly and continuing basis.

The system utilizes and combines three main areas of operation to accomplish its result. They are:

The online calculator for development of the payment scheduler

Account Aggregation for daily access to online account information

Bill payment interface to execute the actual payment of the bill.

Figure 2:
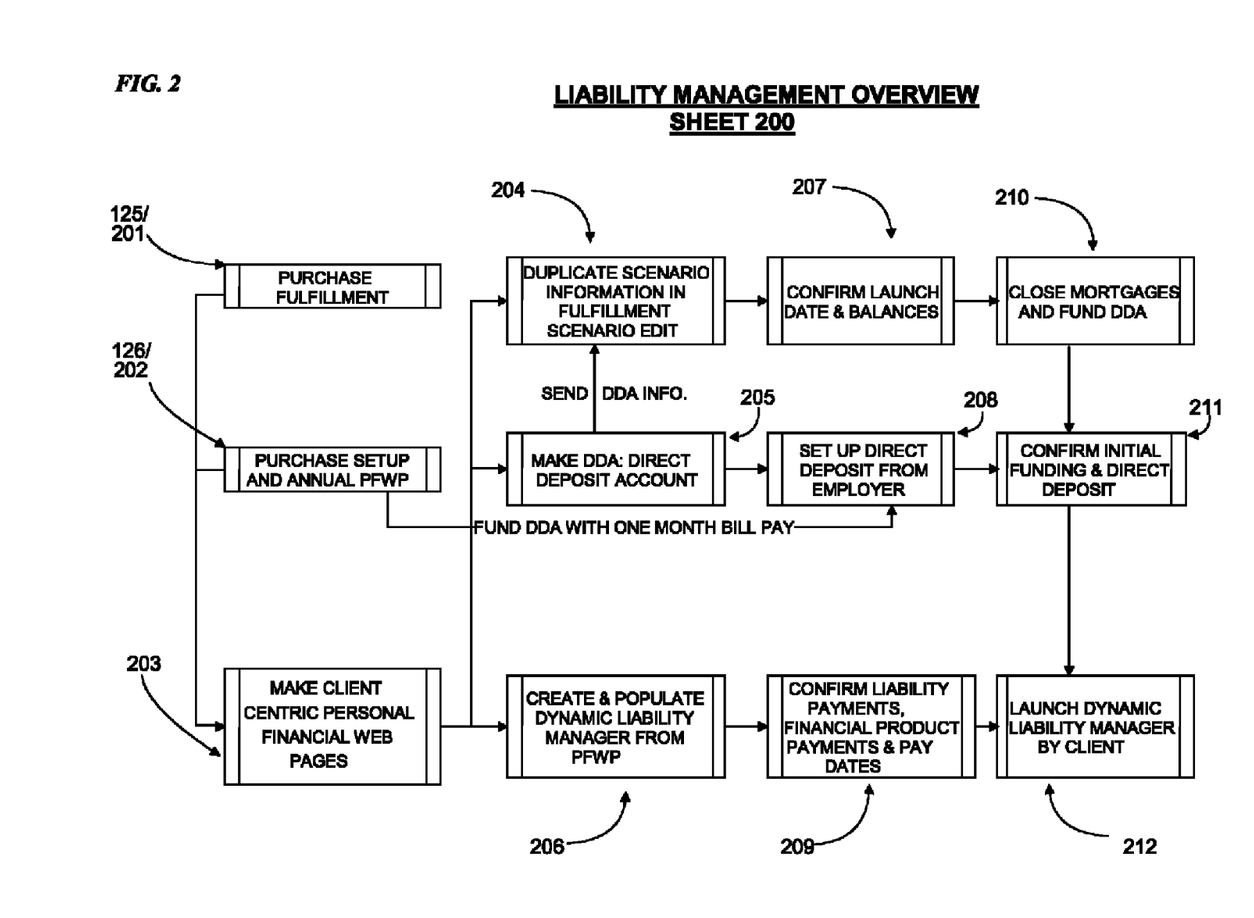

This overall functional area may reside within the Personal Financial Web Page referenced in step 203 of FIG. 2.

The process begins by the triggering of stored payment date information within step 501, the "payment scheduler". Default lead times are initially assumed to be 10 days prior to the due date of the client bill in order to leave adequate time for the processing of the payment.

When the beginning date trigger is "made", the engine confirms the then current liability amount by requesting the information from account aggregation. This process is designed to be routed first through the Dynamic Liability Monitor, (DLM) resident in the PFWP. The "notice of transaction pending" is forwarded to the client for information sake, and is not on the critical path for the completion of the payment. This process and modification is indicated on step 502 of the drawing.

The "Get Vendor Data" request is then forwarded to step 510, the "Vendor Data Interface" for connection to the third party account aggregation service and data feed. This data is an XML data stream request from the step 510 Web Service, (WS). This and all Internet requests referenced are sent over an encrypted SSL, (Secured Socket Link) connection. The step 505 connection enables the request to "refresh" the trade line data to a then current state.

The third party aggregation engine indicated in step 506 utilizes proprietary interfaces with the vendor, or "Payee" step 524 to request and retrieve the client billing information, a new internet connection, step 507 is initiated to this purpose.

Simultaneously, synonymous requests are made for each Payee being managed by the DLM application. The Payee information is then routed back the same path to the DLM Vendor Data Interface, step 510. The data and process are now internal until the later referenced external processes initiated in steps 516 and 517.

The vendor information is duplicated, split and sent to:
Step 501, the payment scheduler, and
Step 513, the Liability Management Calculator, (LMC) as used in step 121.

The LMC calculates a new Liability Management program based on the current information and holds the result for later update. The solution is sent, as indicated in step 514 to the Payment scheduler, step 501 for further disposition.

The Payment Scheduler utilizes prior stored "Period Begin/Period End" information stored in the Scheduler to determine if this is the priority bill upon which the margin is to be paid. If so, it confirms that the margin has not been previously paid within the "Period."

The Payment Scheduler integrates the payment amount with the Payee information to generate a set of Payment Instructions. The Instructions are derived from a newly run Liability Management solution, which includes Payment amounts for all of the included liabilities. The newly generated schedule is sent to step 515 for validity testing.

If the step 515 testing results in a "no" result the exception is identified as a constraint, and the information is returned to step 501 for re-calculation. After re-calculation, the information is again returned to step 515 for validity testing.

Given a "yes" value returned in step 515, the payment instructions are then forwarded to step 516 the "Bill Payment Data Interface", or "BPDI". The BPDI extracts the information regarding the bill, or bills to be paid. Since the information, has already been cross-checked for data integrity by comparing split vendor data sent to the LMC to the data sent to the Payment Scheduler, and the solution has been tested in step 515, "Payment Decision", the bill is ready to be paid. Step 516, the BPDI, having separated the bill or bills to be paid forwards the "Instruction to Pay" to step 517, the Funds Transfer Interface.

Given a valid merge of client and vendor information in step 515, and prior to sending the payment instruction to the disbursement account custodian, a final verification of the liability is performed in step 516 by direct confirmation of the client liability with the Payee. This loop is indicated from step 516 to step 523, the web, to step 524, the Payee, and then back to step 516 via the web 523. Confirmation allows process to proceed to step 517.

Step 517; the Funds Transfer Interface holds the scripts for the interfaces for the vendors. Here the Instructions to pay are merged with the Vendor Interface to create a message that can be understood and acted upon by the vendor. One of the steps in step 209 of FIG. 2, will be the verification of the existence of a Vendor Interface in order to proceed. Absent the presence of said interface the process will notify the operator of its absence, and MoneyAbility, Inc will have to determine to script the interface or withdraw from online management of the liability and notify the client.

Given valid vendor interface the information is sent to the custodial "EBP TRUST ACCT.", or "ETA" indicated in step 518. The ETA is a third party strategically aligned ACH, Automated Clearing House" member that will hold the funds forwarded to it from the client Direct Depository Account, DDA, or Money Market Fund illustrated as step 520. The step 520 account is referred in DLM context as the "Disbursement Account:" or DA. The function of the DA is to hold a depository dollar balance amount of one month worth of the client's interest bearing bill payments. In so doing the Disbursement Account acts as a client owned and directed escrow account that allows a buffer, or cash cushion to facilitate the automatic payment of the bills. This is the account referenced in step 205 of FIG. 2. It may be an existing client owned or managed account, or may be setup for this specific purpose.

Returning to the process, the application now sends via Internet SSL connection as indicated in step 519 a debit request in an amount equal to the dollar amount needed to pay the earlier referenced bill or bills for payment. Since this is the client's account, if an online account the "Funds Transfer section of the Account Aggregation provider uses its "Single Sign On" functionality to access the DA and allow the debit. Given valid and reliable messaging, the request is honored and the dollars are debited from the account and forwarded the ETA, step 518, via the ACH system. The funds are held for 48 hours, at which time they are forwarded to step 524 the designated Payee or Payees, via an Internet connection indicated by step 523.

Upon payment, confirmation of payment is sent to both step 516 the Bill Payment Data Interface and step 518, the ETA. This confirmation is via an SSL Internet connection, step 523. Payment confirmation is then sent to the Client Interface in the DLM Monitor, step 502, and sent via SSL Internet connection, step 503, to the client workstation, step 599. This completes the process.

Figure 6:
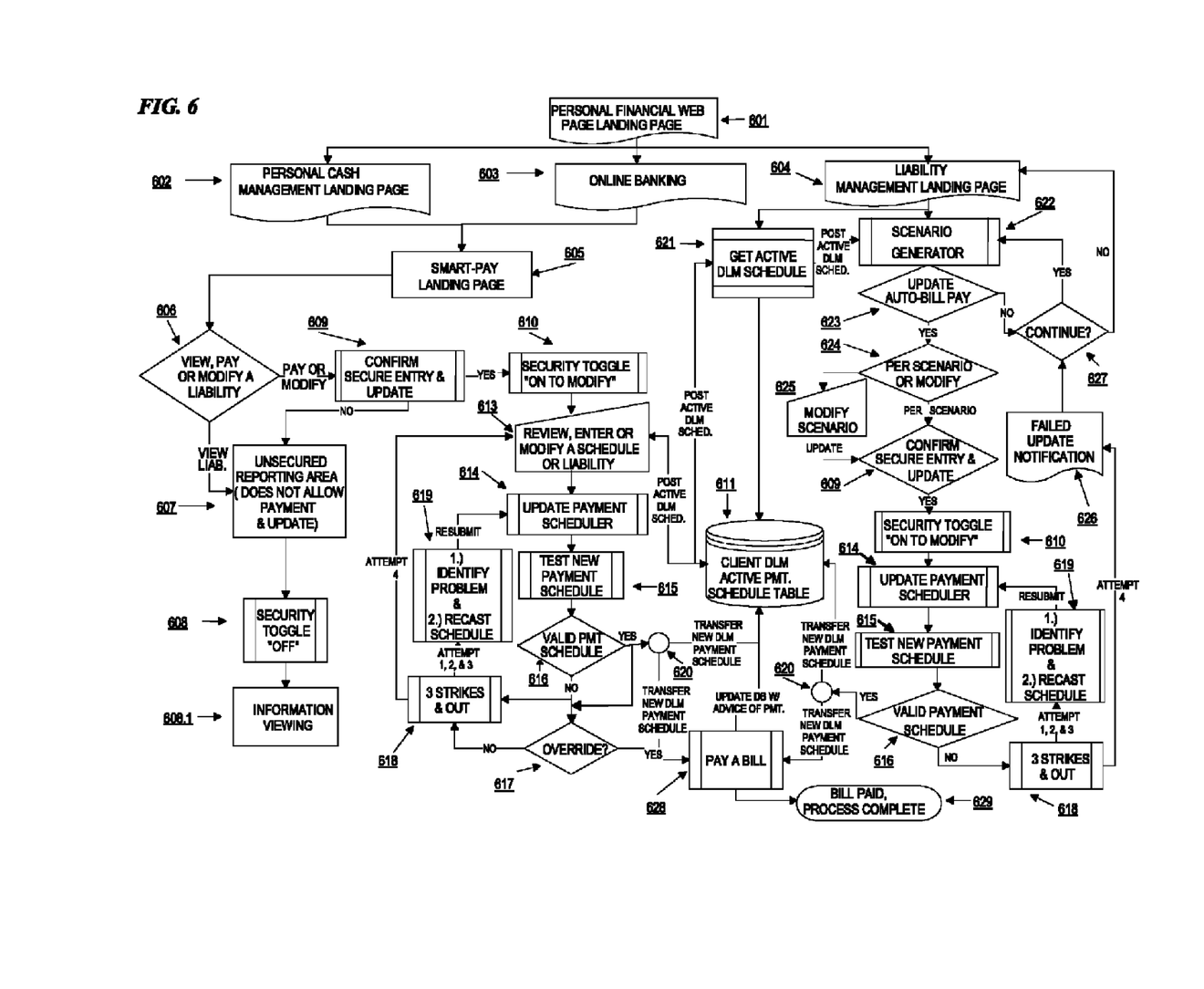

FIG. 6 should be considered in combination with FIG. 5 to gain an expanded view and understanding of the Dynamic Liability Management process. FIG. 5 describes what occurs in order to pay a bill. FIG. 6, though also dealing with processes necessary to pay a bill focuses more on some of the client interface process and tools.

More specifically, and amongst other things, FIG. 6 begins with client access to the tools via different paths within the PFWP, Personal Financial Web Page. The processes described in FIG. 6 share some common elements. Steps 610 through and including step 619, with the exception of step 613 are all common, and are separately described but jointly reference later in the document as "Common Structures."

Depending upon the path the client takes into the application, if from "Personal Cash Management Page, or online banking, the common elements are accessed from step 606. If however the client accesses these processes from the "Liability Management Landing Page" access point, then the common process is reached from step 623.

Step 628 references a transfer to step 501 of FIG. 5. Step 628 correlates to step 524 of FIG. 5.

The process begins by the client accessing the process over the Internet and navigating step 601, the PFWP. At this point the client has three choices, steps 602, 603, and 604. The beginning description will describe entry from step 602 and step 603 which both converge upon step 605 the Smart Pay landing page. The reason for the multiple paths in to step 605 is due to the fact that the previous two steps are each part of a larger marketing bundle with different products, but a common need for this functionality. Neither of the front end requirements changes the following process steps. This is in contrast to some different attribute requirements following from entry to the process via step 604, which shall be developed later in this document.

Step 606 is a decision point where the client chooses the function they wish to perform. If they desire to merely view a liability they can choose to proceed to step 607 which is a "view only" path that does not allow the operator to change any of the liabilities they can view here. It may be possible to link to step 622 for scenario generation if determined desirable. Step 608 is designed as a safety check point to confirm this as a "view only" process. The client can now proceed to step 608.1 and view liability information and complete this process.

If alternatively the operator wishes to pay or modify a bill or liability, they then proceed to step 609. If they reconsider they can opt for step 607 and complete the earlier referenced process. If they wish to proceed to pay or modify a liability, they confirm that decision at this point and the application proceeds to step 610 and allows for payment and modification of a liability.

The client now enters an environment where they can view and edit liabilities in step 613. This step is unique to this process flow in the form in which it is presented to the client. The first action within this step is a call to the Database, step 611, to get the client's latest program information. The client information is now ready for 1.) Review, 2.) Modification, or 3.) Payment. Once the client chooses one of the prior three choices, the information is forwarded to step 614, and updates the payment scheduler.

The payment scheduler accepts information given it, and does not have any rules based intelligence built into it. Clearly, all information in this section must be considered mission critical and any changes or actions need to be tested.

The testing occurs in step 615, which correlates to step 515 in FIG. 5. Here the changes or modifications are tested against a preset rules base in order to assure Quality Control from an informational point of view.

The application then proceeds to the decisioner in step 616. If a "no" value is returned, the application goes to the "strike counter". If the "no" value is the first second or third attempt, the information is sent to step 619 for further analysis. The proposed solution goes through a trouble shooting process. If a problem is discovered and a solution can be developed, the proposed modification to the information is made, and the answer is resubmitted to step 614 and updates the payment scheduler. The application proceeds as before through steps 615 and 616.

If a successful solution is not found in attempts 1, 2 or 3, the advice of the failure on the first 3 attempts is forwarded back to step 613 for the client's decision to proceed, logout, or alternatively to override the Pmt Schedule validity testing. The override decision is step 617 of the process and is unique to this side of the FIG. 6 process. The process currently being described, though highly automated, is a manual process. Allowances need to be present for a client to pay a bill as necessary whether or not it conforms with program requirements or not. This allows for the cases where:

The client may be in error, but a bill needs to be paid, or

Where the application is returning a valid result, outside of program parameters, but cash is available and the bill needs to be paid, or The application is for reasons unknown at this time returning an invalid result and a bill needs to be paid and there is cash available to do so, or Reasons unforeseen at this time.

Given a "yes" value from step 616 the application proceeds connector step 620 where the information duplicates and is sent both to step 628 to pay a bill, and updates the Client information in the Database indicated as step 611.

As earlier stated, the Client has another path into the process as illustrated by step 604, the "Liability Management Landing Page." This path accesses a level of automation in excess of the other entry points shown as steps 602 and 603. When the Client clicks the link to go to the pages containing either the "Current Program" or the "Scenario Generator", the information call and presentation are the same or similar.

The above referenced "click" initiates a call to the Database, step 611, and to retrieve the last scenario in effect for the client utilizing the process illustrated in step 621. The information populates the "Scenario Generator" as shown in step 622.

The Scenario Generator is the primary client area and dashboard for the review, modeling, and/or modification of Liability Management information and opportunities. Functions are listed below:

Viewing area for then current Liability Management program

Input area for "Add or Subtract" monthly cash payment amounts

Scenario Calculator Command area and button

Add/Delete a liability fields

Add/Delete a financial product

Run a new Liability Management Scenario given the input changes to the scenario.

Consolidation modeler

Accelerate only option

"Update Liability Management" capability and button

Once the client information is loaded into step 622 the "Scenario Generator" the client can then model a number of events and changes to the current program. If the client does not wish to continue further to modify or update the active scenario, they can exit to step 627 and loop back to step 604, and proceed to other activities, or logout. If they reconsider and wish to proceed, they can return to step 622, the Scenario Generator.

If, after modifying the existing scenario, the client wishes to implement the changes modeled in step 622, with the press of a single button they can update the "LMP", or "Liability Management Program". The application takes the Client to step 623 to update the Bill Payment Schedule. If the answer is "no" the client can terminate the process or return to step 622 for further modification.

If the answer to the step 623 decision is yes, the application proceeds to the step 624 decision whether to update per the Scenario generated, or to modify the scenario further before implementation. If the client wishes to automatically update per the scenario generated in step 622, the Scenario Generator, they choose yes and proceed to the confirmation and implementation step 609.

Alternatively, if the client wishes to further modify the scenario data, they are directed to step 625 "modify Scenario" where they can further modify or edit scenario information. Upon completion of this step, the application goes to step 609, "Confirm Security Entry and Update. This is the same step as referenced in the directly earlier paragraph. At this point the client is determining they wish to implement modifications to the current scenario. Everything prior to this point has been modeling with no interface to the bill payment structures. Upon confirmation at step 610 by entering approved credentials, or user name and password, the operator can now update, and/or replace the active scenario.

The process at this point is now the same as that indicated in the "Common Structures" referred to in this drawing detail with the exception of step 613. When accessing this functionality through the Liability Management path, all modifications are made prior to entering the second security area. This is to allow for the ability of the client to model aggressively without having to be concerned about impacting the then active scenario. The functional areas in step 613 closely resemble those of step 625. However as earlier stated, step 613 is within the secured area for modification and update, whereas step 625 is intentionally outside of the secondarily secured area that allows modification of the scenarios.

From this point forward the process is almost identical to that described in the "Common Structures" section until we get to a fourth attempt. Here the treatment of the fourth failed attempt differs. In this LM path, the integrity of the scenario takes precedence over the ability to pay a bill, and there is therefore no ability to override a failure to validate the payment schedule in step 616. Therefore, unless payment or modifications to the schedule are validated, the client is directed to step 626, "Failed Update Notification". From here there is no process choice but to return to step 627 where the operator has the choice of returning to step 622, the Scenario Generator, or back to the Liability Management Landing Page, step 604. Should the client need to pay a bill they have the choice of re-entering the process from step 602, or step 603 and proceed to step 613 where they can input the payment change or other modification. Presumably, the change will not pass the validity testing from this direction since the same application structures are used, and the client can use the step 617 override to proceed as earlier described.

Given a "yes" result to step 616 validity testing, the process is the same as the steps referenced in "Common Structures". The application proceeds through step 620, performs the dual function of paying the bill as indicated in step 628, and updating the new scenario the client Database as shown in step 611. The process proceeds to conclusion as indicated in step 629.

What is claimed is:

1. A computerized financial liability management method comprising:
- eliciting and receiving credit report liability information into a computer system, the credit report liability information relating to a plurality of financial liabilities associated with a client including a first financial liability and a second financial liability, each one of the plurality of financial liabilities associated with a respective interest rate;
- eliciting and receiving the respective interest rate information into the computer system, the respective interest rate information corresponding to each one of the plurality of financial liabilities;
- allocating, in the computer system, each of a plurality of payments to be applied toward the plurality of financial liabilities as a function of the respective interest rates associated with the plurality of financial liabilities, wherein the allocating of the plurality of payments includes allocating a first payment scheduled at a first future time period and allocating a second payment scheduled at a second future time period, and wherein the second future time period is after the first future time period, and wherein the allocating includes validity testing the allocation of the plurality of payments and, if the validity testing returns an invalid result, then modifying the allocation of the plurality of payments;
- obtaining pre-confirmation from the client, and storing an indication of the confirmation in the computer system, to apply the plurality of payments toward the plurality of financial liabilities;
- eliciting and receiving, via account aggregation under control of the computer system, current liability information corresponding to the first financial liability;
- adjusting, in the computer system, the allocation of the first payment based on the received current liability information; and
- applying the first payment toward the first financial liability based on the adjusted allocation of the first payment, wherein the applying of the first payment is performed using an electronic-bill-payment system under control of the computer system.

2. The method of claim 1,
- wherein the credit-report-liability information includes trade-line data that identifies the plurality of financial liabilities associated with the client,
- wherein the eliciting and receiving of current liability information includes connecting to an account-aggregation service, and wherein the receiving of the current liability information refreshes the trade-line data to a current state,
- wherein the electronic-bill-payment system includes a client-disbursement account configured to hold a predetermined depository-balance amount, and
- wherein the applying of the first payment includes debiting the first payment from the client-disbursement account and forwarding the payment to a payee associated with the first financial liability, the method further comprising:
- eliciting and receiving information for editing of the plurality of financial liabilities identified by the trade-line data; and
- providing a personal-financial-web browser page that elicits and receives information from the client to manage the allocating of the plurality of payments and the applying of the first payment.

3. The financial liability management method of claim 1, wherein the allocating of the first payment includes allocating at least a respective minimum payment amount to each one of the plurality of financial liabilities such that a first margin amount is available after the allocating of the minimum payment amounts, and wherein the allocating of the first payment includes allocating a portion of the first payment from the first margin amount to a particular one of the plurality of financial liabilities having a highest interest rate.

4. The financial liability management method of claim 1, wherein the account-aggregation data indicating the change in one of the plurality of financial liabilities indicates a change to a second one of the plurality of liabilities having a highest interest rate of those ones of the plurality of liabilities that are still unpaid; and
- the allocating of the second payment includes allocating at least a respective minimum payment amount to each one of the plurality of financial liabilities such that a second margin amount is available after the allocating of the minimum payment amounts, and wherein the adjusting of the second payment further includes allocating a portion of the second payment from the second margin amount to the second one of the plurality of financial liabilities.

5. The financial liability management method of claim 1, wherein the allocating of the plurality of payments includes:
- assisting the client in borrowing money secured by an appropriate mortgage program; and
- applying the borrowed money to at least one of the plurality of financial liabilities based on interest rates associated with the plurality of financial liabilities.

6. The financial liability management method of claim 1, further comprising:
- after the validity testing of the allocation of the plurality of payments, eliciting override information from the client into the computer system; and
- if override information is received, then modifying the allocation of the plurality of payments based on the received override information.

7. The financial liability management method of claim 1, wherein the applying of the first payment includes automatically sending payment instructions to a third-party automated clearing house.

* * * * *